Patented Dec. 7, 1937

2,101,089

UNITED STATES PATENT OFFICE 2,101,089

LATEX STABILIZATION

Izador J. Novak, Bridgeport, Conn., assignor to
Raybestos-Manhattan, Inc., Bridgeport, Conn.,
a corporation of New Jersey No Drawing. Application November 21, 1934
Serial No. 754,124

10 Claims. (Cl. 18—50)

This invention relates to an improvement in the saturating qualities of rubber latex and is more particularly directed to a solution adapted for impregnating fibrous materials with latex or other materials while in the so-called "wet web" condition, for example, in the process disclosed in my United States Patent No. 1,966,458, patented July 17, 1934.

In the wet web process of impregnating, the solution is subjected to substantial pressure and intense friction and agitation. I have found that these and other conditions, especially the friction and agitation, cause coagulation of the latex unless the solution is stabilized to an order not heretofore obtained. The running of the web through the solution and the agitation thereof also cause the solution to foam. The thin films of the bubbles in the relatively static foam thereby formed, dry, any volatile stabilizers present evaporate, and even non-volatile stabilizers are ineffective to prevent coagulation. I have found that anti-foaming agents are necessary and that these agents must be compatible with and cooperate with stabilizing agents to prevent or at least, not encourage coagulation. I have further found that the wet web or the water used in the process, which water is ordinarily not distilled, in some instances contain substances which have an active coagulating effect upon the latex or which cause the latex to foam, in which case the stabilizing or anti-foaming agents must be such as to destroy or render harmless the deleterious substances. Also the production of a good quality product makes necessary the addition of rubber anti-oxidants which will retard or prevent deterioration of rubber in the impregnated web. For successful operation I have found that these anti-oxidants must be of such a nature as not to interfere with the stabilizing and anti-foaming agents and furthermore must not be deleteriously affected by such agents.

The resulting solution should be distinctly alkaline in order to be stable. In addition the resulting solution must have good wetting and saturating qualities so that the rubber will be substantially uniformly distributed throughout the web. This requires, in addition to the prevention of coagulation, that the viscosity of the solution should not be increased materially above the viscosity of the original latex.

It is, therefore, an object of my invention to provide a rubber latex impregnating solution which has good saturating properties, which is stable under considerable friction and agitation, and which produces a high quality product.

A further object of the invention resides in the selection of agents which stabilize the latex against coagulation by pressure, friction, and agitation and act as wetting agents by reducing surface tension and increasing the ease of contact between the liquid and the fibrous materials.

Still a further object resides in the selection of stabilizing agents which act as buffer salts to maintain the pH of the saturant against acidic webs and also as water softeners and precipitants of latex coagulating agents, such as calcium, magnesium, and other polyvalent metallic ions, by forming insoluble precipitates therewith.

I have developed a completely liquid impregnating system which gives excellent results. This liquid is a system comprising an aqueous latex solution, stabilizers, anti-foaming agents, and anti-oxidants. The various materials present in the system are compatible, do not interfere with each other, and conform to the requirements of the system as a whole.

Stabilizers

While the latex solution preferably employed is the ordinary ammonia latex of commerce, so-called ammonia stabilization is not sufficient. The use of latex in my process for impregnating wet webs involves constant and considerable agitation of the impregnating liquid and also frictional forces. Latex solutions which are stable in the ordinary sense of the use of this term are not satisfactory in this process. Coagulation occurs and results in poor penetration and in clogging on the wire of the impregnating machine. I use the term "stabilizer" to cover certain materials added to the system, but the stability is achieved against considerable continued agitation and against frictional forces on the rolls and is to an order not heretofore obtained. This coagulation of the latex on the rolls, under the great frictional forces involved, must be avoided for successful operation. Thus, my use of the term "stabilizer" in describing the present invention is different from that previously encountered.

In general, the stabilizers which I employ are the alkali metal salts of polybasic weak acids, such as the alkali metal salts of oxalic, silicic, phosphoric, arsenic, boric, and carbonic acids. Because of its cheapness and excellent stabilizing properties, I prefer to use sodium silicate in a proportion less than approximately 15% by weight of the latex solids. The amount of sodium silicate necessary under different conditions ranges from approximately 3% to 15% and is usually considerably below 15%. The sodium silicate may be used in either the crystalline or colloidal form since they have equivalent stabilizing properties. In amounts below 15%, sodium silicate does not thicken latex to an objectionable degree. In fact, in some instances it may even reduce the viscosity of the latex solution. For example, a sample of one latex having a viscosity of 34.5 seconds Saybolt Universal at 70° F. had a viscosity of 34.2 seconds when an amount of adhesive sodium silicate slightly less than 15% was added. The addition of the same amount of crystalline sodium silicate to another sample of the same latex raised the viscosity thereof to only 34.7 seconds. It is understood, however, that while I have stated sodium silicate to be the preferable stabilizing agent, the water soluble oxalates, phosphates, arsenates, carbonates, antimonates, and borates may also be used either singly or in conjunction with each other or the sodium silicate. The alkali metal salts of polybasic weak inorganic acids are particularly effective. I have found that quantities of stabilizing agents less than 15% and more than 3% by weight of the latex solids are in general satisfactory, and in most instances 5% is sufficient.

As a guide in employing the above stabilizing agents, the following discussion is given. Since latex particles carry a negative electrical charge, it is desirable in impregnating fibrous materials to protect the latex against positive electrical charges or ions, particularly those carrying more than one positive charge. The ions of the alkali metals do not seem to exert an active coagulating effect on the latex. Therefore, salts of Na, K, Cs, or other alkali metals, and also $NH_4$ may be present in the latext emulsions. Ions of Ca, Mg, Zn, Ba, $Fe^{++}$, Al, Cr, $Fe^{+++}$, or other polyvalent positive ions are, however, to be avoided. The water used in the process is ordinarily not distilled, and the wet web sometimes contains compounds of Ca, Mg, Fe, etc. For this reason salts such as alkali oxalates, alkali phosphates, etc., are helpful in stabilizing the latex emulsions in use since they precipitate these harmful multivalent positive ions as insoluble materials and, therefore, reduce the concentration of these multivalent positive ions in the solution and lessen their influence as coagulants for the negatively charged latex particles.

The compounds of alkali metals, such as K or Na, with acid radicals such as $SiO_3$, $PO_4$, $AsO_4$, $BO_3$, etc., hydrolyze to some extent in aqueous solution, impart alkalinity to the solution, and raise the pH value. This is desirable since latex is coagulated by acids ($H^+$ ions), even acetic acid. These salts, therefore, have additional functions in controlling acidity or alkalinity or as buffers. Also these stabilizers have the property of improving the fiber wetting properties of the latex; i. e., the particular stabilizers disclosed are also introfiers.

To summarize, I am desirous of eliminating from the solution, as far as practical, polyvalent positive ions. Negative ions, such as $PO_4^{---}$, $SiO_3^{--}$, $CO_3^{--}$, $AsO_4^{---}$, and $C_2O_4^{--}$, within reasonable limits are beneficial and helpful in my complete latex impregnating liquid. Moderate excess of reagents such as the alkali salts of these anions is, therefore, not only permissible but desirable.

*Anti-foaming agents*

The impregnation of the wet web, which may contain aluminum stearate or other metallic soaps, by running it through the latex emulsions, particularly at high speeds, leads to the formation of foam. The thin films that comprise the bubbles of foam lose water, ammonia, and other volatile constituents by evaporation and eventually set or coagulate even though non-volatile stabilizers are present. This foaming leads to loss of latex through overflowing the vat, and the resultant coagulation causes clogging of the screen, which necessitates shutting down the mill to remove the coagulated rubber. In order to overcome this I have found that the addition of relatively small percentages of certain materials to the latex solution greatly reduces or inhibits the formation of foam and thus eliminates this difficulty.

Even though the web does not contain soaps such as aluminum stearate, there is still a tendency for the latex to foam. For impregnation of wet webs on which such soaps have not been deposited, I have found that materials selected from the class of organic esters are very satisfactory anti-foaming agents. The esters of aliphatic alcohols having from three to six carbon atoms with polybasic organic acids are particularly effective. Esters from the group of lipoids, particularly lecithin oil mixtures containing high proportions of lipoid, are also good. Thus soybean lecithin, particularly in the presence of some free soybean oil or other fatty oil, is a very good anti-foaming agent. Some esters that work very well are isopropyl oxalate, isoamyl oxalate, n-butyl oxalate, butyl citrate, n-butyl d-tartrate, n-butyl phthalate, isoamyl valerate, and n-butyl d-1-malate. These examples will suggest other equivalents thereof, and obviously certain ones will be adapted for particular wet web compositions, as will be apparent to those skilled in the art. Sufficient amounts of these esters to retard or prevent foaming are employed in the form of aqueous emulsions and in quantities less than 15% of the weight of the rubber solids.

I have found beta naphthol to be a satisfactory anti-foaming agent or foam reducer, but it may slightly increase the viscosity of the latex. It also functions as a mold preventative, in proportions of ½% to 2% on the weight of the impregnated sheet.

In cases where the wet webs to be impregnated contain aluminum stearate or other similar materials, I have found that the relatively short molecule esters are not as effective anti-foaming agents as are esters such as fatty oils or fats which have long hydrocarbon chains, for example, sixteen or eighteen carbon chains. The anti-foaming action of the long carbon chain esters is made more effective by the presence of solvents such as hydrocarbons which dissolve and thin them. These esters are also used in amounts sufficient to retard or prevent foaming and, in general, in quantities less than 15% of the weight of the rubber solids. The anti-foaming agent preferably used when the fibrous materials contain soap is an aqueous emulsion of a glycerin ester of fatty acids such as stearic and oleic acids in a petroleum solvent. Specifically, emulsions of mixtures of a kerosene and lard are good and happen to be relatively non-volatile at the temperatures used and are relatively inexpensive. Other equivalent or similar materials or mixtures thereof may be used, depending somewhat on the nature of the wet web to be impregnated.

In some instances, it will not be necessary to dissolve the glycerine ester in a petroleum solvent before dispersion, in which event, the glycerine ester would be dispersed directly in the water.

Anti-oxidants

In order to prevent oxidation of the finished product and to prolong its life and use, it is desirable to add certain substances to the impregnating solution which will prevent oxidation of the rubber in the finished web. As stated before, these substances must be such as not to interfere with the stabilizing and the anti-foaming agents employed and must not be deleteriously affected by such agents. I have found that "Dispersed Antox" or "Dispersed Neozone" in quantities of 2 to 4% of solids, referred to the latex solids, are satisfactory anti-oxidants. Other well-known anti-oxidants for rubber may be employed in place of the particular ones mentioned if they are compatible with the other constituents of the impregnating solution.

Examples

I. For impregnation of a wet web of cotton rag stock containing aluminum stearate, a latex system of the following composition, in which the proportions are based upon the rubber solids by weight, was used:

| | Parts rubber solids |
|---|---|
| Latex | 100 |
| Ammonia (NH3) | 1.2 |
| Sodium silicate (metso) | 5 |
| Anti-oxidant | 2 |
| Lard | 2 |
| Kerosene | 2 |
| Water—approximately | 250 |

The wet web passing through this at a rate of approximately 100 feet per minute was found to have the latex uniformly distributed through the finished sheet as stripped from the make-up roll. The total rubber content was approximately 30% of the finished stock. No foaming or coagulation was encountered, and the latex solution at the end of the day was pumped back to the storage tank for reuse from day to day.

II. Another example in which sodium oxalate is the stabilizer employed is given below:

| | Parts rubber solids |
|---|---|
| Latex | 100 |
| Ammonia (NH3) | 1.2 |
| Sodium oxalate | 5 |
| Anti-oxidant | 2 |
| Lard | 4 |
| Kerosene | 4 |
| Water—approximately | 350 |

In the above examples other animal or vegetable oils, such as palm oil, as well as mineral fats or oils may be substituted for the lard. Also other solvents such as benzol, toluene, xylol, carbon tetrachloride, gasoline, or ether may be substituted for the kerosene. Also, in impregnating webs in which the fibrous material contains no metallic soaps, the anti-foaming agents having short carbon chains may be substituted for the lard and kerosene in the above examples.

The impregnating liquid suitable for my process, therefore, becomes a rather complicated but definite system made up of a number of interrelated parts or constituents, namely, latex, water, ammonia, anti-oxidants, stabilizers, and anti-foaming agents. Furthermore, all of these constituents must be such that the complete system containing them shall not coagulate under agitation, friction, and pressure effects encountered in carrying out impregnation of fibrous materials with the latex system. The complete system should have a pH value between 9.6 and 13.2 and preferably between 10 and 13. The system should contain polyvalent negative ions in quantities from one fifth up to equal the number of hydroxyl ions. Substantially no polyvalent positive ions should be present. Also, at least some of the polyvalent negative ions or other negative ions should be capable of forming compounds, insoluble in the saturating solution at a pH from approximately 10 to 13, with any polyvalent positive ions likely to be introduced into the solution during impregnation. Furthermore, for successful impregnation the viscosity of the complete system should not be greatly in excess of that of the original latex and should preferably be less than approximately 35 seconds Saybolt Universal at 70° F.

Convenient tests to see if the complete impregnating liquid system is suitable for use on the machine are as follows:

1. To test for stability against pressure, saturate a piece of loosely felted paper, absorbent of latex when dry, such as Krafelt, 4" x 4", with stabilized latex, drain off excess, place between folds of a new piece of water wet sheeting, and then place in a press between wire screens under 5000# total pressure at room temperature. Maintain the pressure twenty minutes and then remove from the press. Tear out from the center of the pressed paper a section about ¾" x ¾" and shake 100 times in a test tube of clean soft or distilled water.

If the latex is satisfactory, impregnation will have occurred almost instantaneously and the piece shaken in the test tube will go into a complete state of pulpiness. The solution will become milky white. If the stabilization is unsatisfactory, the paper will retain its original shape and felting and the solution will be either colorless or only slightly cloudy.

2. To test for stability against friction and agitation, wrap three layers of a 2" bandage of the paper around a 1⅝" shaft revolving at 60 R. P. M. Place 25 cc. of the stabilized latex in the well of a porcelain gum paper moistener which has a porcelain roll 3" in diameter with a 2" face. Mount the container with latex on a lever arm and bring into contact with the revolving bandage. Only sufficient weight should be used on the lever to maintain a slight but positive pressure between the rolls. Stop the rotation after three minutes for the first observation and every two minutes thereafter.

If the latex is not stabilized, the latex will show "legs" of rubber between the folds of the bandage after three minutes. Foaming tendencies will exhibit themselves as an overflow of frothed latex from the well.

A second test for stability against friction may be carried out by placing a 50 cc. sample of the latex in a square 4-ounce sample bottle and stirring with a Hamilton Beach drink mixer, equipped with a slotted hexagonal disc stirrer, until coagulation takes place. Coagulation is observed by removing a few drops at frequent intervals and dropping into a large volume of distilled water. Normal latex will usually run about six minutes on this test.

The first of the tests against friction and agitation discloses stability against rolling or pressure friction and is of more importance than the other test which only indicates stability against friction or agitation such as would be developed in a centrifugal or similar type pump.

By the terms "stabilizer" or "stabilizing agent", as used herein, are meant substances which will render the impregnating solution stable under the tests for pressure friction and agitation above given. Also the term "high stability" employed in the claims is used to mean stability against pressure, friction and agitation as determined by the tests above described.

While I have disclosed the preferred embodiment of my invention, it is to be understood that the details thereof may be varied within the scope of the following claims.

I claim as my invention:

1. A liquid system for impregnating fibrous materials, comprising, rubber latex, a stabilizing agent for said latex including essentially an alkali metal salt of a polybasic weak acid, and an anti-foaming agent compatible with said system.

2. A liquid system for impregnating fibrous materials, comprising, rubber latex, a stabilizing agent for said latex including essentially an alkali metal salt of a polybasic weak inorganic acid, and an anti-foaming agent compatible with said system.

3. A liquid system for impregnating fibrous materials, comprising, rubber latex, a stabilizing agent for said latex including essentially sodium silicate, and an anti-foaming agent compatible with said system.

4. A liquid system for impregnating fibrous materials, comprising, rubber latex, a stabilizing agent for said latex including essentially an alkali metal salt of a polybasic weak acid, an anti-foaming agent compatible with said system, and an anti-oxidant compatible with said system.

5. A liquid system for impregnating fibrous materials, comprising, rubber latex, a stabilizing agent for said latex including essentially an alkali metal salt of a polybasic weak acid, and an anti-foaming agent compatible with said system including essentially a glycerine ester of a fatty acid.

6. A liquid system for impregnating fibrous materials, comprising, rubber latex, a stabilizing agent for said latex including essentially an alkali metal salt of a polybasic weak acid, and an anti-foaming agent compatible with said system including essentially an aqueous emulsion of a glycerine ester of a fatty acid and a solvent for said ester.

7. A liquid system for impregnating fibrous materials, comprising, rubber latex, a stabilizing agent for said latex including essentially an alkali metal salt of a polybasic weak acid, an anti-foaming agent compatible with said system including essentially an aqueous emulsion of lard and kerosene, and an anti-oxidant compatible with said system.

8. A liquid system for impregnating fibrous materials, comprising, ammoniacal rubber latex, a stabilizing agent for said latex including essentially sodium silicate in quantities between 3 and 15% of the weight of the latex solids, an anti-foaming agent compatible with said system including essentially an aqueous emulsion of kerosene and lard, and an anti-oxidant compatible with said system.

9. A liquid system for impregnating fibrous materials, comprising, rubber latex, a stabilizing agent for said latex including essentially an alkali metal salt of a polybasic weak acid, an anti-foaming agent compatible with said system including essentially lecithin admixed with a fatty oil, and an anti-oxidant compatible with said system.

10. A liquid system for impregnating fibrous materials, comprising, rubber latex, a stabilizing agent for said latex including essentially an alkali metal salt of a polybasic weak acid, an anti-foaming agent compatible with said system including essentially an ester of an aliphatic alcohol having from 3 to 6 carbon atoms with a polybasic organic acid, and an anti-oxidant compatible with said system.

IZADOR J. NOVAK.